(12) United States Patent
Gimmler et al.

(10) Patent No.: US 8,944,798 B2
(45) Date of Patent: Feb. 3, 2015

(54) GAS ASSISTED CO-EXTRUSION APPARATUS AND PROCESS FOR FORMING FOODS

(75) Inventors: Norbert Gimmler, Portage, MI (US); Helbert David Almeida Dominguez, Battle Creek, MI (US); Charles Bernath, Fulton, MI (US); Charles A. Smith, Marshall, MI (US); Terry Engle, East Leroy, MI (US); Penny Engle, legal representative, East Leroy, MI (US)

(73) Assignee: Kellogg Company, Battle Creek, MI (US)

( * ) Notice: Subject to any disclaimer, the term of this patent is extended or adjusted under 35 U.S.C. 154(b) by 512 days.

(21) Appl. No.: 13/161,735

(22) Filed: Jun. 16, 2011

(65) Prior Publication Data
US 2011/0311669 A1     Dec. 22, 2011

Related U.S. Application Data

(60) Provisional application No. 61/355,355, filed on Jun. 16, 2010.

(51) Int. Cl.
*B29C 47/06* (2006.01)
*A21C 11/16* (2006.01)
(Continued)

(52) U.S. Cl.
CPC .............. *B29C 47/06* (2013.01); *A21C 11/163* (2013.01); *A23P 1/125* (2013.01); *B29C 47/0011* (2013.01);
(Continued)

(58) Field of Classification Search
CPC .......... A21C 3/04; A21C 9/06; A21C 11/163; A21C 11/00; A21C 11/10; A21C 11/16; A23P 1/125; A23P 1/142; A23P 1/144; A23P 1/10; A23P 1/105; A23P 1/12; A23P 1/14; B29C 47/06; B29C 47/12; B29C 47/126; B29C 47/128; B29C 47/20; B29C 47/26; B29C 47/30; A23L 1/0076; A23L 1/0079; A23L 1/0088; A23L 1/1802; A23L 1/1805; A23G 3/0236; A23G 3/0242; A23G 3/20; A23G 3/2007; A23G 3/2015; A23G 4/04

USPC ................ 425/130, 131.1, 133.1, 326.1, 465, 425/131.5, 113, 114, 190, 307, 380, 392, 425/462, 283, 446, 498, 517

See application file for complete search history.

(56) References Cited

U.S. PATENT DOCUMENTS

| 2,816,837 A | 12/1957 | Holsman |
| 2,976,155 A * | 3/1961 | Heller ........................... 426/284 |

(Continued)

FOREIGN PATENT DOCUMENTS

| DE | 3311794 A | 11/1984 |
| DE | 3417196 A1 | 11/1985 |

(Continued)

OTHER PUBLICATIONS

International Search Report, Dated Mar. 14, 2012, 5 Pages.

*Primary Examiner* — Seyed Masoud Malekzadeh
(74) *Attorney, Agent, or Firm* — Honigman Miller Schwartz & Cohn LLP; Kathryn D. Soulier, Esq.; Jonathan P. O'Brien

(57) ABSTRACT

A gas assisted co-extrusion apparatus includes a co-extrusion die in communication with an extruder. A nozzle that is defined by a bore in the co-extrusion die extends about a nozzle axis to a nozzle exit of the co-extrusion die. An injector extends through the bore of the co-extrusion die along the nozzle axis. The injector and nozzle together form a dough into a rope that is tubular with a wall portion and an inner cavity surrounded by the wall portion as the dough is extruded out of the nozzle exit and about the injector. A compressed gas source provides a compressed gas out of an injector outlet and into the inner cavity of the rope to radially stretch the wall portion of the rope as the rope is dispersed from the injector. The co-extrusion die is spaced from the extruder to define a void therebetween. A delivery system delivers an entrainable material to the compressed gas in a pipe. The pipe is connected to an injector inlet of the injector in the void. This allows the pipe to operate within the ambient temperature of the environment and for the entrainable material to be entrained into the compressed gas prior to being introduced into the injector.

20 Claims, 4 Drawing Sheets

(51) Int. Cl.
*A23P 1/12* (2006.01)
*B29C 47/00* (2006.01)
*B29C 47/30* (2006.01)
*B29C 47/04* (2006.01)
*B29C 47/86* (2006.01)

(52) U.S. Cl.
CPC ............ *B29C 47/0023* (2013.01); *B29C 47/30* (2013.01); *B29C 47/043* (2013.01); *B29C 47/864* (2013.01)
USPC ............... 425/133.1; 425/190; 425/326.1; 425/380; 425/462; 425/114; 426/283; 426/446; 426/496; 426/517

(56) References Cited

U.S. PATENT DOCUMENTS

| | | | |
|---|---|---|---|
| 3,480,445 A * | 11/1969 | Slaybaugh | 426/284 |
| 3,499,766 A * | 3/1970 | Scharschmidt et al. | 426/559 |
| 3,615,675 A | 10/1971 | Wisdom | |
| 3,622,353 A * | 11/1971 | Bradshaw et al. | 426/284 |
| 3,764,715 A * | 10/1973 | Henthorn et al. | 426/273 |
| 3,917,863 A * | 11/1975 | Kaufman et al. | 426/283 |
| 4,259,051 A * | 3/1981 | Shatila | 425/133.1 |
| 4,834,635 A | 5/1989 | Groen | |
| 4,888,192 A * | 12/1989 | Ramnarine | 426/448 |
| 5,120,554 A * | 6/1992 | Farnsworth et al. | 426/282 |
| 5,124,161 A * | 6/1992 | van Lengerich et al. | 426/94 |
| 5,333,538 A * | 8/1994 | Sawa | 99/353 |
| 5,587,193 A | 12/1996 | Kazemzadeh | |
| 5,645,872 A | 7/1997 | Funahashi | |
| 5,686,128 A * | 11/1997 | Tracy et al. | 426/284 |
| 6,328,550 B1 | 12/2001 | Sheen et al. | |
| 6,506,401 B1 * | 1/2003 | Rothamel et al. | 424/439 |
| 6,586,031 B1 | 7/2003 | Kelly | |
| 6,632,466 B2 * | 10/2003 | Roussel et al. | 426/516 |
| 6,905,703 B2 * | 6/2005 | Rothamel et al. | 424/439 |
| 7,337,708 B2 * | 3/2008 | Rothamel et al. | 99/450.7 |
| 2003/0066433 A1 * | 4/2003 | Rothamel et al. | 99/357 |
| 2005/0084577 A1 * | 4/2005 | Rothamel et al. | 426/512 |

FOREIGN PATENT DOCUMENTS

| | | |
|---|---|---|
| EP | 0168276 A1 | 1/1986 |
| FR | 2572899 A1 | 5/1986 |
| FR | 2572899 A1 | 5/1986 |
| GB | 1253104 | 10/1971 |
| GB | 2297936 A | 8/1996 |
| WO | 2008095544 A1 | 8/2008 |

\* cited by examiner

GAS ASSISTED CO-EXTRUSION APPARATUS AND PROCESS FOR FORMING FOODS

CROSS REFERENCE TO RELATED APPLICATION

This application claims the benefit of U.S. Provisional Patent Application Ser. No. 61/355,355 for an "AIR ASSISTED CO-EXTRUSION PROCESS FOR FORMING FOODS", filed on Jun. 16, 2010, which is hereby incorporated by reference in its entirety.

BACKGROUND OF THE INVENTION

1. Field of the Invention

The subject invention relates to a gas assisted co-extrusion apparatus for forming food products such as cereal or snack food and a method for using the same.

2. Description of the Prior Art

Conventional co-extrusion systems are designed such that a dough material is extruded about a pumpable filling or fluid. Typically, these systems are designed such that the pumpable filling or fluid is supplied to a co-extrusion die via a pipe attached to the die. The pipe is typically attached at a 90° angle to the die face and then takes a 90° turn inside the die in order to align itself with the center of the die orifice through which the food material is being extruded. The food material is extruded over the pipe creating an inner cavity in the food material as the pipe pumps the filling, or fluid into the inner cavity.

One such system is disclosed in U.K. Patent Application No. 2297936A to Frame. The Frame application discloses a die assembly for the extrusion of an expandable product. The die defines a through bore in which the expandable product is fed from a die face. A co-axial gas pipe is supported in the bore and includes a free end which projects outwardly from the die face. The gas pipe disclosed in the Frame application is attached at a 90° angle to the die face and then takes a 90° turn inside the die, specifically in the bore, in order to align itself with the center of the bore through which the expandable product is being extruded. In addition, the gas pipe enters the die adjacent the die face and as such, only travels over a limited portion of the bore. A die outlet is defined at the die face between the through bore and a tubular spacer that is secured to the gas pipe. Frame further discloses the use of a second pipe for depositing a cream into the product. The expandable product is fed over the tubular spacer and out the die outlet. Based on the heat and pressure of the expandable product at the die outlet, as the expandable product exits the die outlet, it expands. Thus, at the die outlet, the expandable product has a wall thickness that is greater than the thickness of the die outlet between the bore and tubular spacer.

Another such system is disclosed in U.S. Pat. No. 6,586,031 to Kelly. The Kelly patent discloses a method for making hollow tube shaped food pellets or half products. Upon further heating, the pellets of Kelly are puffed to produce expanded, shaped snack products with annular cavities. The method of Kelly begins with the step of extruding dough through a extruder having a die insert. Dough from the extruder is passed through the die insert to form a tube-like rope having a wall portion defining a inner cavity extending axially along the tubular rope. Air is introduced into the inner cavity of the rope via an injector mounted within the die insert as the tubular rope exits the die insert. The air is introduced to the inner cavity to support the wall portion of the tubular rope such that the tubular rope extrudate exiting the die insert maintains its shape without being deformed by the subsequent handling of the tubular extrudate by the stretching rollers. Upon exiting the die insert, the dough immediately expands, or pre-puffs, because of the sudden pressure drop (from the pressure inside the co-extrusion die to atmospheric pressure) and the flash boiling water in the dough. The dough is allowed a specified distance to cool after exiting the die insert before it enters a gap formed between an upper roller and a bottom roller. Each roller generally approximates a conveyor belt assembly. The rollers are spaced from one another such that the distance between them equals the diameter of the die insert exit and is therefore slightly smaller than the expanded, pre-puffed rope entering the gap. Accordingly, the rope is compressed as it enters the gap between the rollers. The rollers are operated at a speed greater than the speed at which the rope is being extruded. Accordingly, upon contacting the rope, the rollers stretch the rope axially along the direction in which the rope is being extruded. The stretching preformed by the rollers counteracts the expansion caused by the pre-puffing and produces a rope having a diameter equal to the diameter of the exit of the die insert. The air supplied to the inner cavity of the rope is controlled such that sufficient pressure is applied to the wall portion of the rope to prevent the collapse of the inner cavity as the rope is compressed and axially stretched by the rollers. Upon exiting the rollers, the rope is fed into a cutter which cuts the tubular rope into discrete hollow tube shaped food pellets or half products for further processing.

SUMMARY OF THE INVENTION

The subject invention provides for a gas assisted co-extrusion apparatus for use with an extruder. The extruder produces a dough and includes an extruder exit for the movement of the dough out the extruder. A co-extrusion die extends between a rear face and a front face and is in communication with the extruder to receive the dough from the extruder. At least one nozzle is defined by a bore in the co-extrusion die. The nozzle extends about a nozzle axis to a nozzle exit at the front face of the co-extrusion die. At least one injector, which is tubular, extends between an injector inlet and an injector outlet and along the nozzle axis. The injector extends from the rear face to the front face of the co-extrusion die and through the bore of the co-extrusion die. The injector enters the co-extrusion die through the rear face of the co-extrusion die. The injector and nozzle form the dough into a rope that is tubular with a wall portion and an inner cavity surrounded by the wall portion as the dough is extruded out of the nozzle exit and about the injector. A compressed gas source provides a compressed gas to the injector to radially stretch the wall portion of the rope as the rope is dispersed from the injector. The radial stretching is a result of the pressure introduced to the wall portion of the rope by the compressed gas distributed into the inner cavity of the rope from the injector outlet of the injector. A pipe extends between the compressed gas source and the injector to transport the compressed gas to the injector. The pipe extends between an upstream end disposed adjacent the compressed gas source and a downstream end disposed adjacent the injector. A delivery system is in communication with the pipe and delivers an entrainable material, such as a plurality of particulates, to the pipe. The co-extrusion die is spaced from the extruder to define a void therebetween. The downstream end of the pipe is connected to the injector inlet of the injector in the void. This allows the pipe to operate within the ambient temperature of the environment. The injector is supplied with the compressed gas entrained with the entrainable material prior to entering the injector inlet of the injector. The injector deposits the entrainable material on an inside surface of the wall portion of the rope as the rope is radially stretched by the compressed gas that is entrained within the entrainable material or plurality of particulates.

In general terms, this invention provides a co-extrusion process for producing formed food pieces modified such that a stream of compressed gas is introduced into the inner cavity of extruded ropes of food material, such as for example cooked dough. The subject invention envisions further embodiments of the co-extrusion process such that a material may be entrained into the stream of compressed gas such that it may be deposited within the inner cavity of extruded ropes of food material such as for example cooked dough.

Advantages of the Invention

An advantage of the subject invention includes acquiring the capability to produce formed food pieces having a lower density than those produced using known co-extrusion machinery.

Another advantage of the subject invention includes acquiring the capability to produce formed food pieces having a unique texture differing from those produced using known co-extrusion machinery.

Another advantage of the subject invention includes utilizing the carrying capacity of the compressed air or gas to carry particulates for the purpose of filling or coating the hollow cavity of an extruded food material rope with the particulates.

Another advantage of the subject invention includes reduced clogging of the pipe feeding the entrained particulate into the co-extrusion die by moving the ninety degree bend in the pipe from its old location within the co-extrusion die to a location external to the co-extrusion die. This allows the radius of the bend to be significantly larger than in conventional co-extrusion dies and the bend takes place in an environment at ambient temperature rather than the elevated temperature inside the co-extrusion die.

Further advantages will be understood by those skilled in the art upon review of the detailed description provided herein.

DETAILED DESCRIPTION OF THE ENABLING EMBODIMENTS

Figure 1:
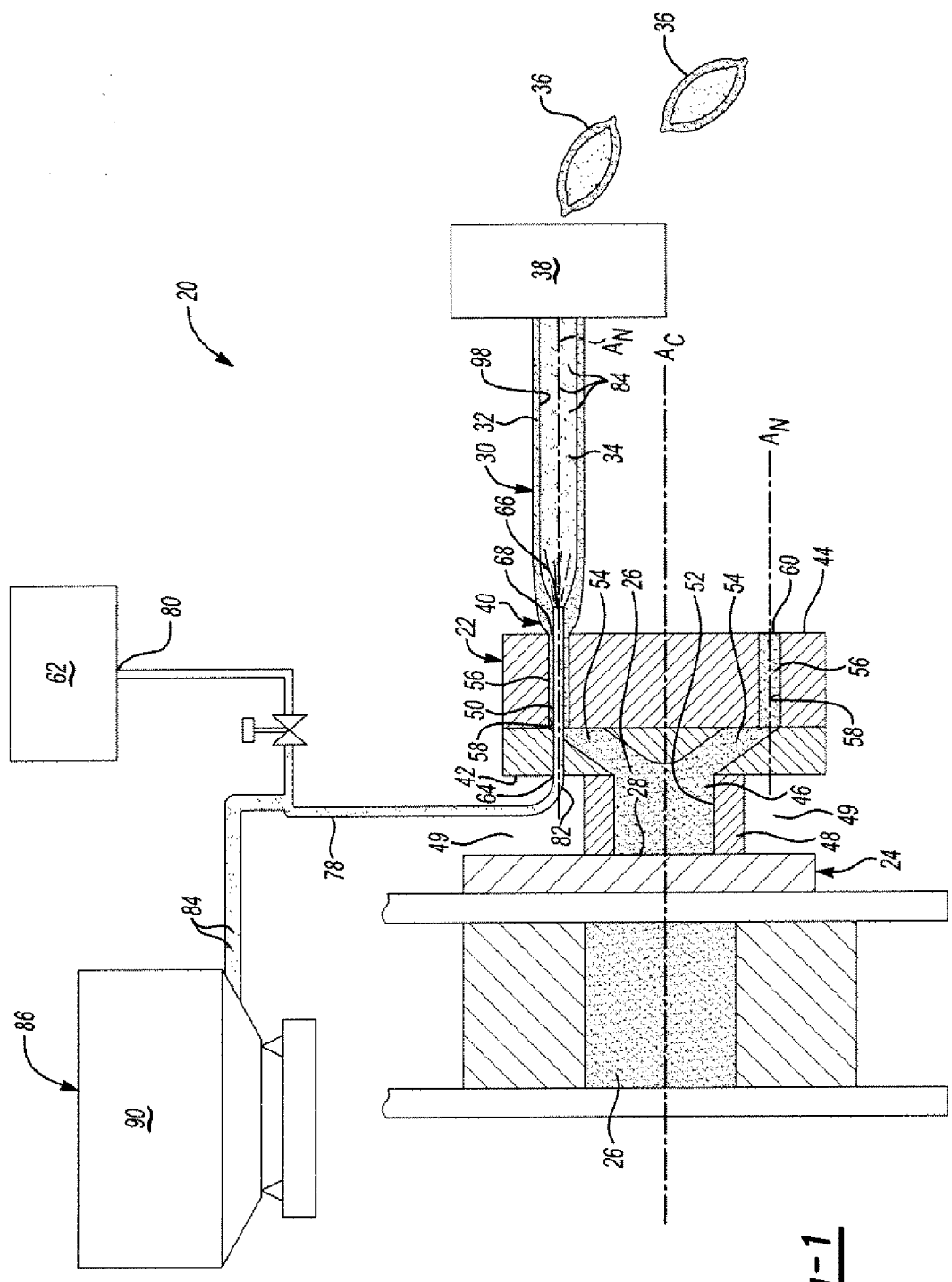
FIG. 1 is a schematic diagram showing the operation of an exemplary embodiment of the subject invention to produce a formed food and the delivery of particulates to the formed food.

With reference to the Figures, wherein like numerals indicate corresponding parts throughout the several views, a gas assisted co-extrusion apparatus 20 for forming food products is generally shown.

The gas assisted co-extrusion apparatus 20 includes a co-extrusion die 22 for attachment to an extruder 24. The co-extrusion die 22 is in communication with the extruder 24 to receive a dough 26 from the extruder 24. The extruder 24 produces the dough 26 and includes an extruder exit 28 for the movement of the dough 26 out the extruder 24. While it should be appreciated that the extruder 24 could be any type of extruder 24, the disclosed extruder 24 is a DX Extruder 24 which extrudes under heat and pressure.

Food material, such as cooked dough 26 from the cooking extruder 24 enters the co-extrusion die 22 and is extruded into ropes 30 about a stream of compressed gas or air. Extrusion in this manner produces tube-like ropes 30 of dough 26 having a wall portion 32 defining an inner cavity 34 that extends generally axially along the centerline of the rope 30. Upon exiting the co-extrusion die 22, the ropes 30 are cut into discrete food pieces 36 having an inner cavity portion by, for example, a rotary crimper-cutter 38. The discrete food pieces 36 may be enclosed, pillowed shaped products, open ended products, 3-D shaped food products, or any other shaped food product known in the art. In the exemplary embodiment, the dough 26 is a cooked dough 26, but the dough 26 may be any extrudable dough 26 or plastic and elastic food material known in the art of extrusion.

The co-extrusion die 22 of the present invention extends between a rear face 42 and a front face 44 and is used to form the dough 26 received from the extruder 24 into the rope 30. A die inlet 46 is defined by the co-extrusion die 22 and extends along a center axis $A_C$ from the rear face 42 towards the front face 44 of the co-extrusion die 22. The die inlet 46 is in communication with the extruder exit 28 of the extruder 24 to receive the dough 26 from the extruder 24.

The co-extrusion apparatus 20 of the present invention may include an extension 48 that extends between the extruder exit 28 of the extruder 24 and the die inlet 46 of the co-extrusion die 22. The extension 48 transfers the dough 26 from the extruder 24 to the co-extrusion die 22. The tubular extension 48 has an extension diameter $d_1$ that is less than the extruder diameter $d_2$ of the extruder 24 and the co-extrusion diameter $d_3$ of the co-extrusion die 22 to define a void 49 between the rear face 42 of the co-extrusion die 22 and the extruder 24. The void 49 allows for the use of an injector 50 that enters the co-extrusion die 22 from the rear face 42. In addition, the void 49 provides for clearance and placement of a pipe 78 in the void 49. The advantage of this will be discussed in greater detail below. While the extension 48 of the exemplary embodiment teaches an inner tube portion 52 that extends linearly along the center axis $A_C$ for the movement of the dough 26 therethrough, it should be noted that the inner tube portion 52 can have any geometry known in the art. For example, the inner tube portion 52 may be taper between the extruder exit 28 the die inlet 46. The extension 48 may be modified to provide for different flow characteristics for the dough 26.

At least one channel 54 is defined by the co-extrusion die 22 and in communication with the die inlet 46. In the exemplary embodiment, the co-extrusion die 22 defines a plurality of channels 54 that receive the dough 26 from the die inlet 46 and direct the flow of the dough 26 from the die inlet 46. The channels 54 extend radially from the die inlet 46 and are in communication with a nozzle 56.

The nozzle 56 directs the flow of the dough 26 out of the co-extrusion die 22. The nozzle 56 is defined by a bore 58 in the co-extrusion die 22 that extends along a nozzle axis $A_N$ to a nozzle exit 60 at the front face 44 of the co-extrusion die 22. In the exemplary embodiment, the nozzle axis $A_N$ is parallel to the center axis $A_C$.

In the exemplary embodiment, the co-extrusion die 22 includes a plurality of nozzles 56, with each of the nozzles 56 being defined by a bore 58 in the co-extrusion die 22. Each of the plurality of nozzles 56 are spaced radially about the front face 44 and the center axis $A_C$ and extend along a corresponding nozzle axis $A_N$ to a nozzle exit 60. Each of the nozzles 56 are in communication with a corresponding channel 54 that creates a path of movement through the co-extrusion die 22, from the die inlet 46, through the channel 54 and out the nozzle exit 60. While the shape of the bore 58 in the exemplary embodiment is generally cylindrical, the shape of the bore 58 which defines the nozzle 56 could be oval or any other two dimensional extrudable shape known by one skilled in the art.

The co-extrusion apparatus 20 of the present invention further includes at least one injector 50 that extends through the co-extrusion die 22 along the nozzle axis $A_N$. The injector 50 is in communication with a compressed gas source 62 to transfer a compressed gas in the form of a compressed gas stream through the co-extrusion die 22 and into the inner cavity 34 of the rope 30. In the exemplary embodiment, the co-extrusion apparatus 20 includes a plurality of injectors 50 with each of the injectors 50 extending completely and linearly through the co-extrusion die 22 and along the nozzle axis $A_N$. The injector 50 is tube shaped and extends between an injector inlet 64 and an injector outlet 66. The injection outlet 66 of the injector 50 may protrude outwardly from the front face 44 of the co-extrusion die 22 along the nozzle axis $A_N$. This ensures that the compressed gas stream and any material contained within the compressed gas stream hits the inside of the extruded rope 30 after the extruded rope 30 is cooled down enough that it does not tear or burst when it is radially stretched by the pressure of the compressed gas inside the rope 30. In the exemplary embodiment, the injector inlet 64 protrudes outwardly from the rear face 42 of the co-extrusion die 22 along the nozzle axis $A_N$ and into the void 49 disposed between the extruder 24 and the co-extrusion die 22.

An annular ring 68 is defined at the nozzle exit 60 between the bore 58 and the at least one injector 50. The annular ring 68 defines the initial shape of the dough 26 as the dough 26 exits that nozzle exit 60. That is, the rope 30, which includes the wall portion 32 and the inner cavity 34 within the wall portion 32, is formed as the dough 26 is dispersed through the annular ring 68 and over the injector outlet 66. The outer shape of the annular ring 68 is determined by the shape of the bore 58. While the shape of the bore 58 in the exemplary embodiment is generally cylindrical, the shape of the bore 58 which defines the annular ring 68 could be oval or any other two dimensional extrudable shape known by one skilled in the art.

The positioning of the injector 50 through the entire length of the nozzle 56 provides cooling to the dough 26 to reduce the initial stretching of the dough 26 upon exiting the nozzle exit 60. This cooling, in addition to a positive pressure within the nozzle 56 result in a product having a lower density. The longer length of the injector 50 in the nozzle 56 provides for this cooling with or without the compressed gas moving through the injector 50, but the cooling may be enhanced by the flow of the compressed gas through the injector 50.

The present invention may further include an insert 70 that extends between an insert opening 72 and an insert exit 74 and that is disposed in the bore 58 adjacent the nozzle exit 60. The diameter of the insert 70 decreases from the insert opening 72 to the insert exit 74 to compress the dough 26 prior to exiting the co-extrusion die 22. When the insert 70 is used, the annular ring 68 is defined between the insert exit 74 and the at least one injector 50 to form the rope 30.

A compressed gas supply line 76 or pipe 78 is connected to the injector inlet 64 to supply a compressed gas or air in the form of a compressed gas stream from a compressed gas source 62 to the injector 50. The compressed gas flows from the injector inlet 64 and towards the injector outlet 66 where the compressed gas exits the injector 50 and is fed into the inner cavity 34 of the rope 30 as the rope 30 is formed over the injector outlet 66. The compressed gas allows for the inflation of the rope 30 and radial stretching of the wall portion 32 of the rope 30. In the preferred embodiment of the subject invention, compressed air is supplied to the co-extrusion die 22. Compressed air is preferable because it is non-toxic and many food processing facilities have a source of compressed air readily available. However, it is envisioned that alternative sources of compressed gas could be used such as compressed nitrogen gas, gaseous carbon dioxide, or a supercritical fluid or liquid that converts into a gas under the given extrusion conditions among others.

A pipe 78 having an upstream end 80 and a downstream end 82 transports the compressed gas stream from the compressed gas source 62 to the injector 50. The pipe 78 may be made from any known material known in the art, including, but not limited to stainless steel, plastic, or PVC. The pipe 78 is mounted externally from the co-extrusion die 22 with the upstream end 80 is connected to the compressed gas source 62 and the downstream end 82 is connected to the injector inlet 64 of the injector 50. The downstream end 82 is connected to the injector inlet 64 in the void 49 between the extruder 24 and the rear face 42 of the co-extrusion die 22. This allows the pipe 78 to operate within the ambient temperature of the environment instead of the higher temperature within the co-extrusion die 22. This is particularly important when a particulate 84 is entrained into the compressed gas stream. The ambient temperature outside the co-extrusion die 22 allows for the particulates 84 to flow through the pipe 78 without melting which could lead to clogging in the pipe 78.

The pipe 78 further includes at least one bend or angle to transition. This may be a ninety degree bend or any other angle to transition. In the exemplary embodiment, the pipe 78 is mounted such that the ninety degree bend of the pipe 78 is located outside of the co-extrusion die 22 thus allowing the pipe 78 to operate within the ambient temperature of the environment instead of the higher temperature of the co-extrusion die 22. Additionally, the external mounting position allows for a pipe 78 having a bend of larger radius and a pipe 78 of larger diameter if desired. In the disclosed embodiment, the ninety degree bend of the pipe 78 has a radius of greater than 1 inch. The location of the bend in the ambient temperature outside the co-extrusion die 22 also assist with the flow of the particulates 84 through the pipe 78 and into the injector 50.

A delivery system 86 is connected in series with the pipe 78 to feed an entrainable material, such as a plurality of particulates 84, into the compressed gas stream. In the exemplary embodiment of the subject invention, as the ropes 30 exit the co-extrusion die 22, the entrainable material or particulates 84 entrained in the compressed gas stream are blown through the inner cavity 34 within the ropes 30 and are deposited on the inside surface 98 of the wall portion 32 of the rope 30. It is envisioned that the entrainable material is not limited to particulates 84 but could include pastes, powders, fillings, doughs, starches, sugar, spices, creams, or liquids. In this way filler materials or alternatively materials for adding additional color and flavor may be applied to the inside of the food piece.

The delivery system 86 could be used to feed a single type of entrainable material or a plurality of entrainable materials to the compressed gas.

Figure 2:
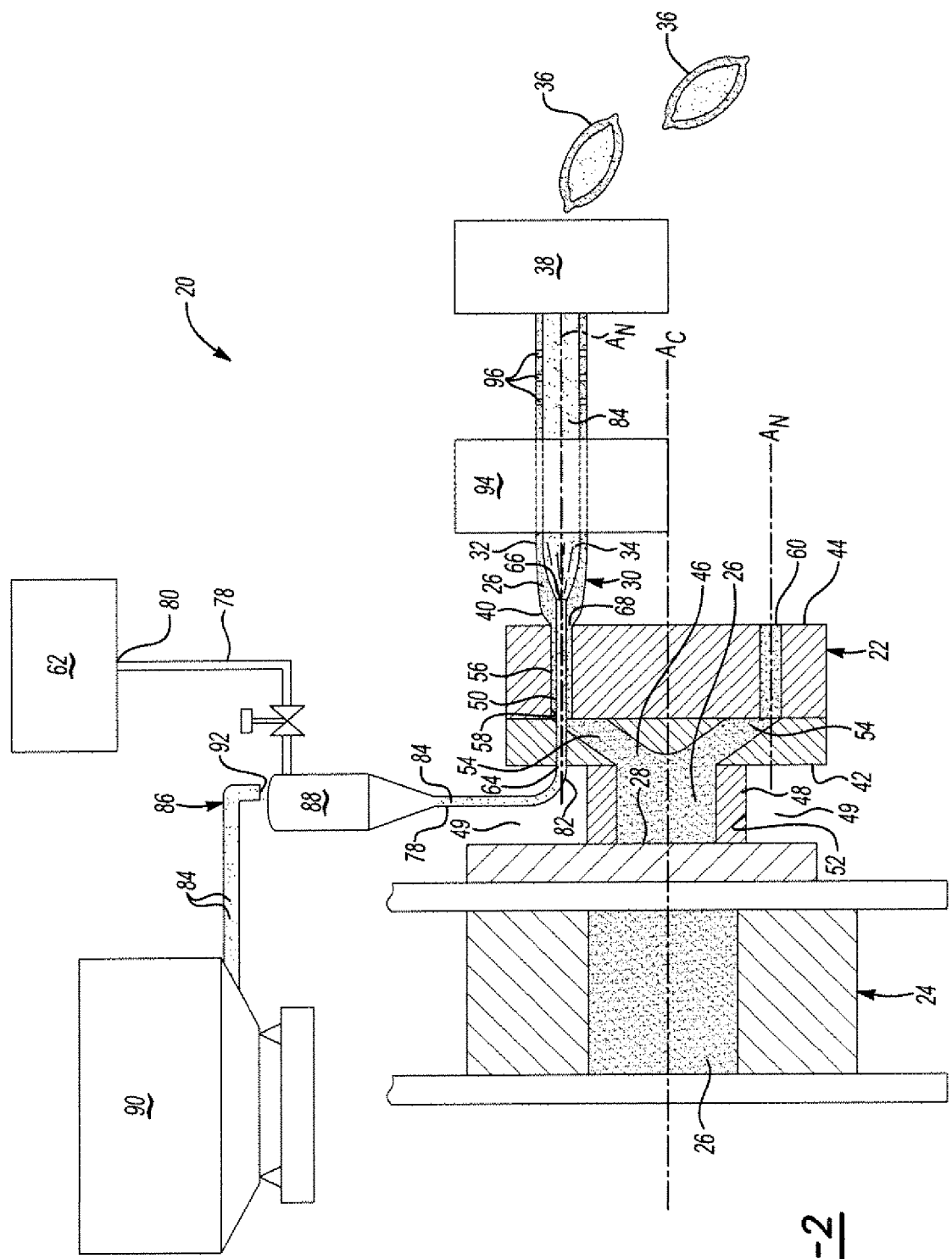
FIG. 2 is a schematic diagram showing the operation of a second exemplary embodiment of the subject invention to produce a formed food and the delivery of particulates to the formed food.
Figure 3:
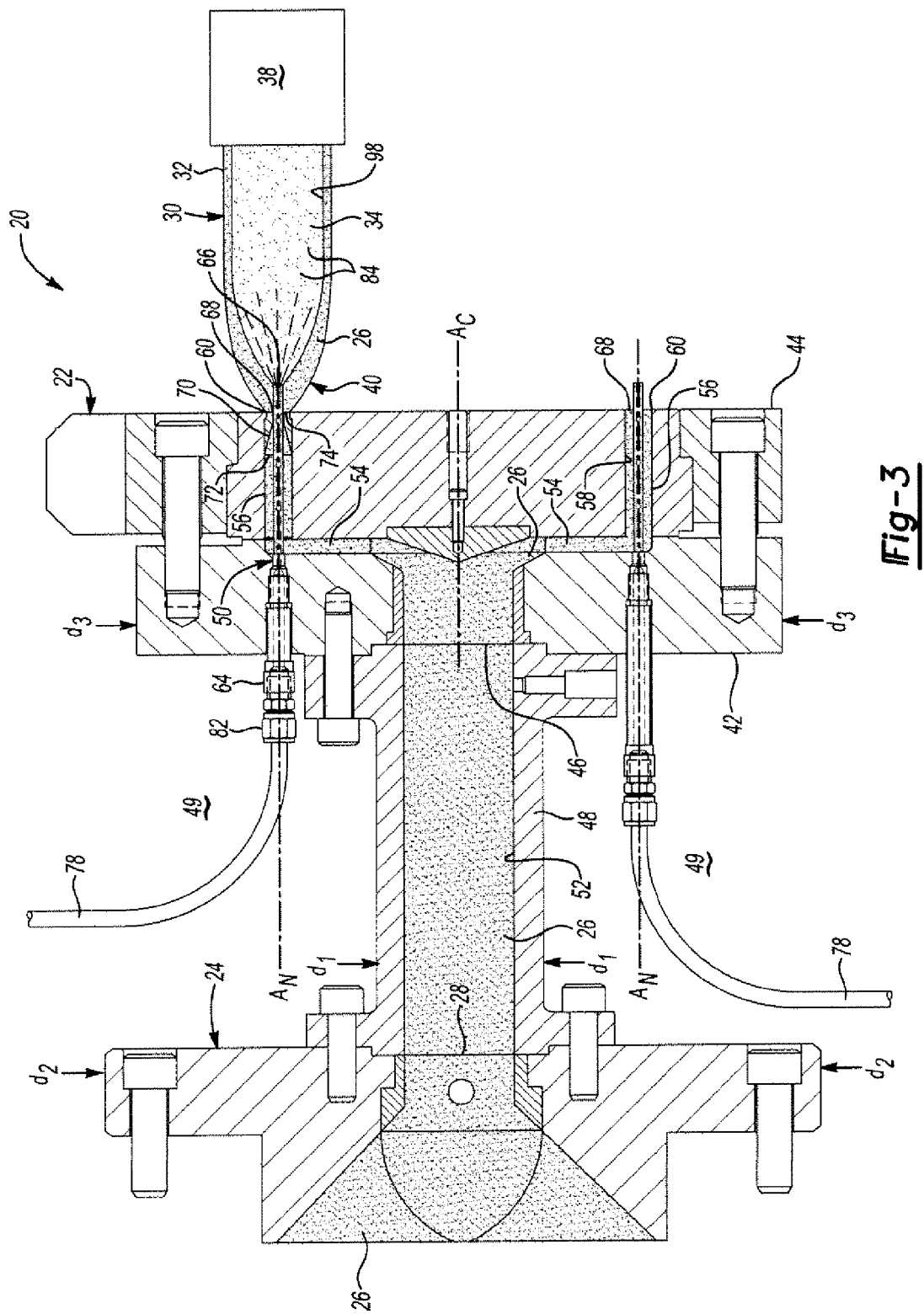
FIG. 3 is a partial cross-sectional side view showing a co-extrusion die with the feeding pipe outside the co-extrusion die assembly.
Figure 4:
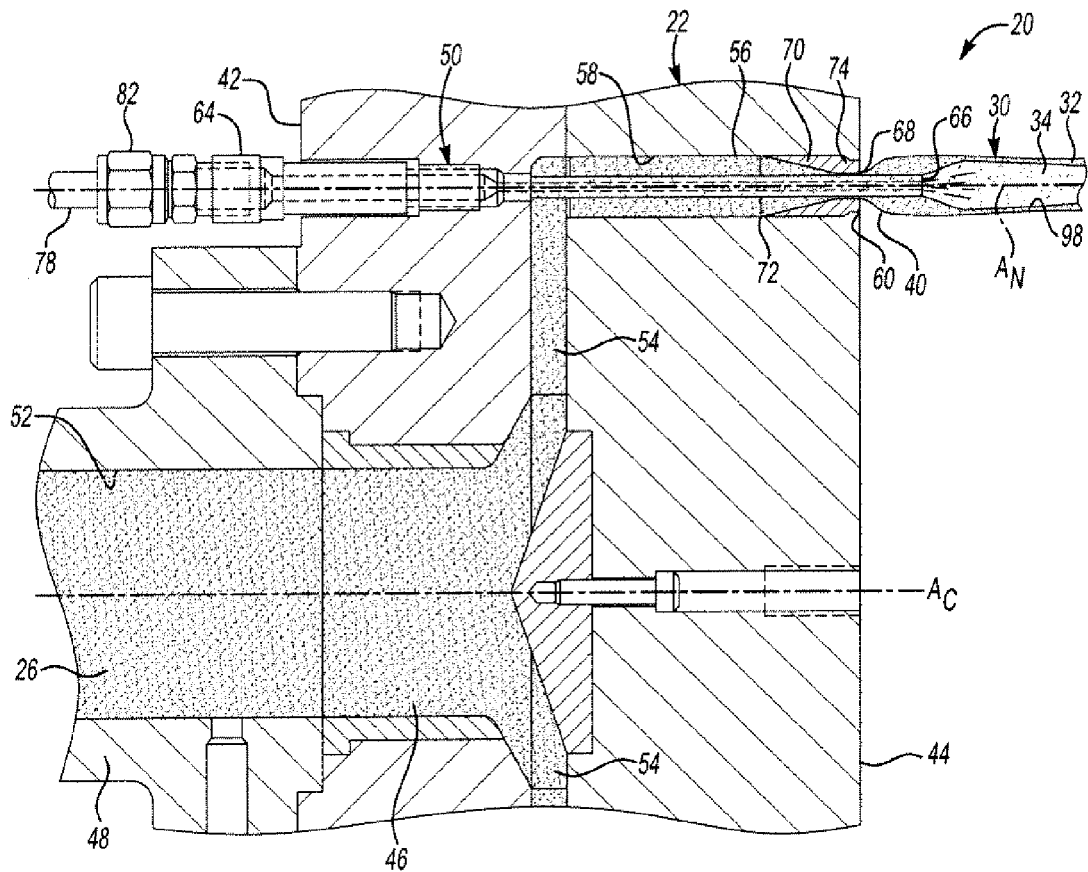
FIG. 4 is a partial cross-sectional side view of the present invention showing an air assisted co-extruder.
Figure 5:
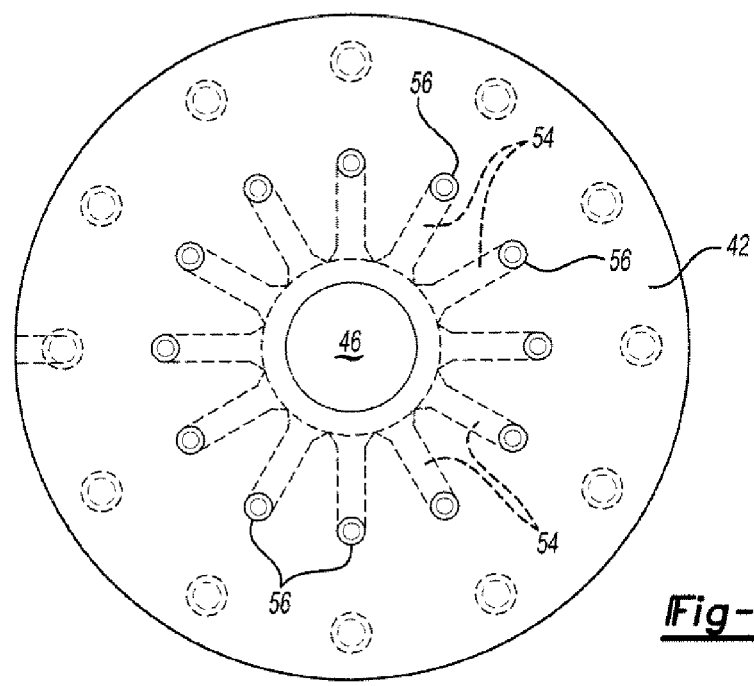
FIG. 5 is a partial elevation view from the rear face of the co-extrusion die of the present invention showing the in feed of the co-extrusion die.

The delivery system 86 may include a venturi pneumatic eductor 88, as shown in FIG. 2, and a feeder 90. The delivery system 86 delivers the entrainable material or plurality of particulates 84 to the pipe 78 prior to the downstream end 82 of the pipe 78. As a result, the particulates 84 are introduced to the compressed gas stream prior to entering the injector 50 and are introduced at ambient temperature. As shown in FIG. 2, the feeder 90 holds a supply of particulates 84 and dispenses metered amounts of the particulates 84 or entrainable material at an outlet port 92. The disclosed particulate feeder 90 has an auger to transport the particulates 84 to the outlet port 92. The feeder 90 is spatially oriented such that the particulates 84 or entrainable material are dispensed into the venturi pneumatic eductor 88. The venturi pneumatic eductor 88 utilizes pressure provided by the venturi effect to introduce the particulate 84 into the compressed gas stream. Accordingly, the co-extrusion die 22 is supplied with a compressed gas stream containing entrained particulates 84.

In an alternative embodiment of the subject invention as seen in FIG. 1, it is envisioned that the venturi pneumatic eductor 88 may be replaced by a simple T-type connection or any other way known in the art to introduce the entrainable material into an gas stream. It is also understood that the feeder 90 may be replaced by a simple material feed-line where the entrainment of a pumpable material is desired.

As the rope 30 exits the co-extrusion die 22, the dough 26 is stretched at 40 from the pressure introduced to the wall portion 32 by filling the inner cavity 34 of the rope 30 with compressed gas and entrained particulate 84 from the compressed gas stream exiting the injector outlet 66. Accordingly, the dough 26 is radially stretched such that the wall portion 32 is reduced in thickness. Significantly, this reduction in wall portion 32 thickness corresponds to a unique food piece texture and low food piece density. The subject invention allows for the production of food pieces having a texture and density distinct from the co-extruders known in the art. Specifically, food pieces having a low density between 10 ounces per gallon and 30 ounces per gallon can be produced, with 14 ounces per gallon being preferred. Additionally, the subject invention allows for the production of food pieces having a crunchy and flaky texture.

The present invention may further include a cutter 38 that is spaced from the front face 44 of the co-extrusion die 22 to cut the rope 30 into the discrete food pieces 36. In the exemplary embodiment, the cutter 38 is a rotary crimper-cutter 38, but any crimper 38 or cutter 38 known in the art may be used. In the preferred embodiment of the subject invention, the rotary crimper-cutter 38 at least partially seals one end of the rope 30 such that the compressed gas stream is trapped within the inner cavity 34 of the rope 30. Consequently, the inner cavity 34 is continuously filled with compressed gas and entrained particulates 84 for stretching the wall portion 32 at of the rope 30. It is understood that the rotary crimper-cutter 38 is not necessary to the operation of the subject invention and that a compressed gas stream of sufficient pressure could be utilized to stretch the wall portion 32 of the rope 30 in the absence of the sealing function provided by the rotary crimper-cutter 38.

The present invention may further include a perforating apparatus 94 that applies a plurality of perforations 96 to the rope 30. The perforations 96 extend radially through the wall portion 32 of the rope 30 and allow for the flow of the compressed gas stream through the perforations 96. The perforations 96 allow for the use of increased amounts of the compressed gas and further for the addition of increased amounts of particulates 84 into the inner cavity 34 of the rope 30 without additional inflation of the rope 30. The perforating apparatus 94 may include, but is not limited to, a spiked wheel, a laser beam, a water jet or any other perforating apparatus 94 known in the art.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A gas assisted co-extrusion apparatus for forming food products comprising:
   an extruder for producing a dough and having an extruder exit for a movement of the dough out said extruder;
   a co-extrusion die extending between a rear face and a front face and being in communication with said extruder for receiving the dough from said extruder;
   at least one nozzle defined by a bore in said co-extrusion die and extending about a nozzle axis to a nozzle exit at said front face of said co-extrusion die;
   at least one injector being tube shaped and extending between an injector inlet and an injector outlet, from the rear face to at least the front face of the co-extrusion die, and through said bore of said co-extrusion die along said nozzle axis for forming the dough into a rope that is tubular with a wall portion and an inner cavity surrounded by the wall portion as the dough is extruded out of said nozzle exit and about said injector;
   a compressed gas source upstream from and in communication with said injector for supplying a compressed gas to said injector for radially stretching the wall portion of the rope from a pressure introduced to the wall portion of the rope by said compressed gas distributed into the inner cavity of the rope from said injector outlet of said injector;
   a pipe extending between said compressed gas source and said injector and having an upstream end and a downstream end for transporting said compressed gas to said injector; and
   a delivery system connected in series with said pipe to deliver an entrainable material into said compressed gas within said pipe prior to said downstream end of said pipe;
   said co-extrusion die being spaced from said extruder to define a void therebetween and wherein said downstream end of said pipe is connected to said injector inlet of said injector in said void for allowing said pipe to operate within an ambient temperature of an environment and wherein said injector is supplied with said compressed gas entrained with said entrainable material prior to entering said injector inlet of said injector and said injector deposits said entrainable material on an inside surface of the wall portion of the rope as the rope is radially stretched.

2. The gas assisted co-extrusion apparatus as set forth in claim 1 wherein said injector inlet protrudes outwardly from said rear face of said co-extrusion die along said nozzle axis and into said void.

3. The gas assisted co-extrusion apparatus as set forth in claim 1 wherein said pipe further includes at least one bend between said upstream end to said downstream end.

4. The gas assisted co-extrusion apparatus as set forth in claim 1 wherein said nozzle exit is defined as an annular ring between said bore and said at least one injector.

5. The gas assisted co-extrusion apparatus as set forth in claim 1 further including a perforating apparatus for applying a plurality of perforations to the rope to allow a use of additional amounts of said compressed gas and further for incorporating additional amounts of said entrainable material into the inner cavity of the rope without additional stretching of the rope.

6. The gas assisted co-extrusion apparatus as set forth in claim 5 wherein said perforating apparatus is one of a spiked wheel, a laser beam, and water jet.

7. The gas assisted co-extrusion apparatus as set forth in claim 1 further including a die inlet defined by said co-extrusion die and extending along a center axis and being in communication with said extruder exit of said extruder for receiving the dough from said extruder.

8. The gas assisted co-extrusion apparatus as set forth in claim 7 further including at least one channel being defined by said co-extrusion die and in communication with said die inlet for receiving the dough from said die inlet and directing a flow of the dough from said die inlet.

9. The gas assisted co-extrusion apparatus as set forth in claim 8 wherein said at least one nozzle is in communication with said at least one channel for receiving the dough from said at least one channel and directing the flow of the dough out of said co-extrusion die.

10. The gas assisted co-extrusion apparatus as set forth in claim 7 wherein said nozzle axis is parallel to said center axis.

11. The gas assisted co-extrusion apparatus as set forth in claim 7 wherein said co-extrusion die includes a plurality of nozzles and a plurality of channels, each of said nozzles being defined by a corresponding bore in said co-extrusion die and extending along a corresponding nozzle axis to said nozzle exit at said front face of said co-extrusion die and wherein said plurality of nozzles are spaced radially about said front face and said center axis, each of said channels being defined by said co-extrusion die and in communication with said die inlet for directing a flow of the dough from said die inlet to a corresponding one of said plurality of nozzles.

12. The gas assisted co-extrusion apparatus as set forth in claim 11 further including a plurality of injectors, each of said plurality of injectors extending along a corresponding nozzle axis.

13. The gas assisted co-extrusion apparatus as set forth in claim 7 further includes an extension being tubular and extending between said extruder exit of said extruder and said die inlet of said co-extrusion die for transferring the dough from said extruder to said co-extrusion die, and wherein said extension has an extension diameter being less than an extruder diameter of said extruder and a co-extrusion diameter of the co-extrusion die to define said void between said rear face of said co-extrusion die and said extruder.

14. The gas assisted co-extrusion apparatus as set forth in claim 1 further including a cutter spaced from said front face of said co-extrusion die for cutting the rope into discrete food pieces.

15. The gas assisted co-extrusion apparatus as set forth in claim 1 further including a cutter for at least partially sealing an end of the rope such that said compressed gas is trapped within the inner cavity of the rope to continuously fill the rope with said compressed gas and said entrainable material for radially stretching the wall portion of the rope.

16. The gas assisted co-extrusion apparatus as set forth in claim 1 wherein said injector outlet of said injector protrudes outwardly from said front face of said co-extrusion die along said nozzle axis for cooling the rope and increasing a resiliency of the rope such that the rope will not burst or tear when radially stretched.

17. The gas assisted co-extrusion apparatus as set forth in claim 1 wherein said delivery system includes a feeder for holding said entrainable material and dispensing metered amounts of said entrainable material to said compressed gas within said pipe.

18. The gas assisted co-extrusion apparatus as set forth in claim 17 further including a venturi pneumatic eductor being spatially oriented from said feeder and in communication with said pipe for receiving said entrainable material from said feeder, wherein said venturi pneumatic eductor utilizes positive pressure provided by a venturi effect for introducing said entrainable material into said compressed gas within said pipe.

19. The gas assisted co-extrusion apparatus as set forth in claim 1 wherein said delivery system includes a T-type connection to connect said delivery system to said pipe.

20. The gas assisted co-extrusion apparatus as set forth in claim 1 wherein the injector protrudes outwardly from said front face of said co-extrusion die along said nozzle axis.

\* \* \* \* \*